US009269966B2

(12) United States Patent
Tseng et al.

(10) Patent No.: US 9,269,966 B2
(45) Date of Patent: Feb. 23, 2016

(54) METHOD AND DEVICE FOR PREPARING PLATINUM CATALYST

(71) Applicant: National Tsing Hua University, Hsinchu (TW)

(72) Inventors: Fan-Gang Tseng, Hsinchu (TW); Yi-Shiuan Wu, Hsinchu (TW); Liang-You Lin, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 266 days.

(21) Appl. No.: 14/046,637

(22) Filed: Oct. 4, 2013

(65) Prior Publication Data

US 2015/0099210 A1 Apr. 9, 2015

(51) Int. Cl.

| | | |
|---|---|---|
| *H01M 8/10* | (2006.01) | |
| *H01M 4/92* | (2006.01) | |
| *H01M 4/90* | (2006.01) | |
| *H01M 4/88* | (2006.01) | |
| *B01J 23/42* | (2006.01) | |
| *B01J 23/89* | (2006.01) | |
| *B01J 19/00* | (2006.01) | |
| *B01J 31/28* | (2006.01) | |
| *B01J 37/08* | (2006.01) | |

(52) U.S. Cl.
CPC ............... *H01M 4/926* (2013.01); *B01J 31/28* (2013.01); *B01J 19/0013* (2013.01); *B01J 23/42* (2013.01); *B01J 23/89* (2013.01); *B01J 37/08* (2013.01); *H01M 8/10* (2013.01); *H01M 2008/1095* (2013.01)

(58) Field of Classification Search
CPC ........... H01M 4/90; H01M 4/88; H01M 4/92; H01M 4/8825; H01M 4/926; H01M 2008/1095; H01M 8/10; H01B 1/04; H01B 1/122; C01B 31/02; C01B 31/0273; C01B 31/0293; B01J 23/42; B01J 31/28; B01J 23/89; B01J 19/0013; B01J 37/08
See application file for complete search history.

(56) References Cited

U.S. PATENT DOCUMENTS

| | | | | |
|---|---|---|---|---|
| 2006/0172179 A1* | 8/2006 | Gu et al. | | 429/44 |
| 2009/0227445 A1* | 9/2009 | Lee et al. | | 502/101 |
| 2011/0129762 A1* | 6/2011 | Lee et al. | | 429/524 |

OTHER PUBLICATIONS

"Carbon nanotubes supported platinum catalysts for selective hydrogenation of m- and o-chloronitrobenzene", Han et al., Indian Journal of Chemistry, vol. 46A, Nov. 2007, pp. 1747-1752.*

"High pressure organic colloid method for the preparation of high performance carbon nanotube-supported Pt and PtRu catalysts for fuel cell applications", Wu et al., Science China Technological Sciences, Jan. 2010, vol. 53, No. 1: 264-271.*

(Continued)

*Primary Examiner* — Kenneth Douyette

(74) *Attorney, Agent, or Firm* — WPAT, P.C.; Anthony King

(57) ABSTRACT

A method and device for preparing platinum catalyst are disclosed. The method comprises providing a carbon-based material; immersing the carbon-based material with a platinum precursor solution in a first container; controlling pressure and temperature within the first container to a predetermined temperature and predetermined pressure to form water vapor, and then allowing the water vapor to escape from the first container through a first opening of the first container to a second container; and maintaining the predetermined temperature and predetermined pressure within the first container for a period of time to reduce the catalyst on the carbon-based material.

20 Claims, 4 Drawing Sheets

(56) References Cited

OTHER PUBLICATIONS

Liang-You Lin et al., "Effects of catalytic activity of nanocatalysts using modified open-loop reduction system with a controlled pressure loop for micro DMFCs", The 7th Nationwide Conference for Hydrogen Energy and Fuel Cell, Taichung, Taiwan, Oct. 26-27, 2012.

Liang-You Lin et al., "Improvement of Catalytic Activity of Nanocatalysts Using Modified Open-Loop Reduction System With a Controlled Pressure Loop for Micro DMFCS", PowerMEMS 2012, Atlanta, GA, USA, Dec. 2-5, 2012.

* cited by examiner

METHOD AND DEVICE FOR PREPARING PLATINUM CATALYST

BACKGROUND OF THE INVENTION

1. Field of the Invention

The present invention relates to a method and device for preparing platinum catalyst, especially relates to a method and device for preparing platinum catalyst with modified reaction pressure.

2. The Prior Arts

Fuel cells are capable of providing high energy efficiency and relatively rapid start-up. Moreover, fuel cells are capable of generating power without generating the types of environmental pollution that characterize in many other sources of power. Thus, fuel cells can be a key to substituting conventional power sources, meeting critical energy needs while also mitigating environmental pollution. Fuel cells are electrochemical devices that convert chemical energy directly into electrical energy without combustion. The combination of high efficiency, low environmental impact, and high power density has been and will continue to be the driving force of vigorous researches, dedicated to apply fuel cells in areas such as transportation, residential power generation, and portable electronic applications.

For fuel cells, platinum (Pt), ruthenium (Ru) and their alloy are mainly used as the catalysts in the electrochemical reaction. Currently, chemical reduction and electrodeposition are the most common methods for preparing catalysts, which are a part of electrodes. Chemical reduction method is typically utilized by immersing a catalyst support in the catalyst precursor solution followed by heating the catalyst precursor solution to a predetermined temperature. During the heating process, the catalyst precursor solution starts to boil and produce water vapor at the boiling point. The water vapor then condenses through a condenser and flows back to the original catalyst precursor solution to maintain the ratio of water to reducing agent, which is also called reflux method. In the meantime, catalyst reduces gradually on the catalyst support. Compare to the electrodeposition method, the chemical reduction method is not only easier to operate under simple experiment conditions, but also smaller size of catalysts can be obtained.

However, the traditional chemical reduction (or reflux) method requires about 3-8 hours to complete the catalyst preparation, which is a time-consuming work. Wu et al. (Science in China Series E: Technological Sciences January 2010, Volume 53, Issue 1, pp. 264-271) performed the reduction process under high pressure (1 MPa, or 10 atm) for 8 hours. Accordingly, it is essential to simplify the preparation conditions of the chemical reduction method with superior catalyst characteristics (size, uniformity and electrochemical property).

SUMMARY OF THE INVENTION

In accordance with one aspect of the present invention, a method of preparing Pt catalyst comprises providing a carbon-based material; immersing the carbon-based material with a platinum precursor solution in a first container; controlling pressure and temperature within the first container to a predetermined temperature and predetermined pressure to form water vapor, and then allowing the water vapor to escape from the first container through a first opening of the first container to a second container instead of condensing and flowing back into the first container as in prior art; and maintaining the predetermined temperature and predetermined pressure within the first container for a period of time to reduce the catalyst on the carbon-based material.

Optionally, the carbon-based material is pretreated with a strong acid solution under vacuum to modify its surface property from hydrophobicity to hydrophilicity. Preferably, the vacuum condition is less than $9 \times 10^{-2}$ torr.

Preferably, the platinum precursor comprises chloroplatinic acid, platinum chloride or platinum nitrate.

Preferably, the predetermined temperature ranges from 110 to 160° C. More preferably, the predetermined temperature is 130° C.

Preferably, the predetermined pressure ranges from 760 to 850 torr. More preferably, the predetermined pressure is 850 torr.

In accordance with another aspect of the present invention, a device for implementing the above-mentioned method, comprises: a first container with a first opening; a temperature sensor and a pressure sensor, configured in the first container; a heater for heating the first container; a second container with a second opening; a tube for connecting the first opening and the second opening; and a pressure controller equipped in the second container to adjust the pressure release within the second container.

In accordance with another aspect of the present invention, a fuel cell comprising a membrane electrode assembly, which comprises a cathode comprising a first catalyst, an anode comprising a second catalyst and a proton-conductive membrane; wherein at least one of the first catalyst or the second catalyst is prepared by the method according to the above-mentioned method.

DETAILED DESCRIPTION OF THE PREFERRED EMBODIMENTS

Figure 1:
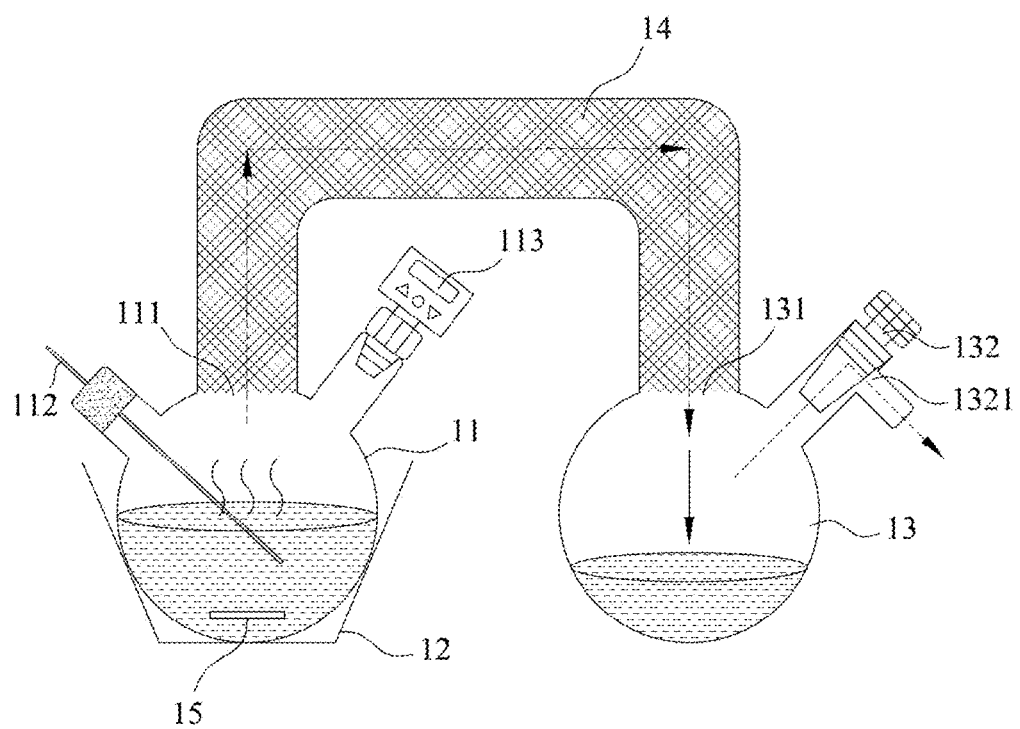
FIG. 1 schematically illustrates the device for implementing the method of the catalyst preparation.

A method of preparing Pt catalyst according to an embodiment of the present invention is described in detail hereinunder. In the following description, a case where the device for preparing Pt catalyst is taken as an example. However, it should be understood that the scope of the invention is not limited only to the materials, sizes, shapes, relative positions of constituent members described in this embodiment unless otherwise noted specifically.

Definition

The term "about" provides a variation based on given process variables, such as a variation of 10% or less, preferably 5% or less.

Method of Preparing Platinum Catalyst

The method of preparing Pt catalyst in the present invention comprises providing a carbon-based material; immersing the carbon-based material with a platinum precursor solution in a first container; raising pressure and temperature within the first container to a predetermined temperature and predetermined pressure to form water vapor, and then allowing the water vapor to escape from the first container through a first opening of the first container to a second container; and maintaining the predetermined temperature and predetermined pressure within the first container for a period of time to reduce the catalyst on the carbon-based material.

In a preferred embodiment, the carbon-based material is pretreated in a strong acid solution under a vacuum condition to exhibit a hydrophilic surface property. The strong acid comprises sulfuric acid, nitric acid, or mixed solution of sulfuric acid, etc. In one embodiment, the vacuum condition is within the $10^{-2}$ order of magnitude of pressure measured in torr (or less than $9 \times 10^{-2}$ torr).

In preferred embodiments, the carbon-based material comprises single-walled carbon nanotube, double-walled carbon nanotube, multi-walled carbon nanotube, carbon black, carbon fiber or graphene.

In preferred embodiments, the platinum precursor comprises chloroplatinic acid, platinum chloride or platinum nitrate, and chloroplatinic acid is more preferred.

Optionally, the platinum precursor solution further comprises a reducing agent and deionized (DI) water, and the reducing agent preferably comprises methanol, ethylene glycol, formaldehyde, paraformaldehyde, sodium borohydride, sodium thiosulfate, sodium sulfite, ethanol, citric acid or glucose. In an embodiment, the reducing agent is ethylene glycol.

In preferred embodiments, the predetermined temperature is about 110-160° C. In a more preferred embodiments, the predetermined temperature is about 130° C.

In preferred embodiments, the predetermined pressure is about 760-850 torr. In a more preferred embodiments, the predetermined pressure is about 850 torr.

In preferred embodiments, a period of time is less than 80 minutes.

Example 1

First, multi-walled carbon nanotube (MWCNT, 50-100 nm in diameter) as the catalyst support is pretreated in a 6 M sulfuric acid solution under about $10^{-2}$ order of magnitude of pressure measured in torr, followed by heating at 80° C. for 1 hour, and then immersed into a platinum precursor solution in a first container. The platinum precursor solution contains chloroplatinic acid, ethylene glycol and deioned water. The first container is heated to a predetermined temperature of 130° C. and predetermined pressure of 850 torr, the platinum precursor solution starts to boil gradually and form water vapor, and the water vapor escapes from the first container through a first opening. Then, the temperature and pressure are kept at the predetermined conditions for about 75 minutes to reduce the Pt nanoparticles on the carbon nanotubes.

Furthermore, adjust the predetermined pressure ranging from 650 to 850 torr and fix the other reduction conditions to prepare the catalysts in comparison with their particle size, dispersion uniformity and electrochemical properties.

Device for Preparing Platinum Catalyst

Referring to FIG. 1, showing the device for implementing the above-mentioned method, which comprises: a first container 11 with a first opening 111, a temperature sensor 112 and a pressure sensor 113 equipped in the first container 11 to measure the temperature and the pressure changes within the first container 11, respectively; a heater 12 for heating the first container 11; a second container 13 with a second opening 131; a tube 14 for connecting the first opening 111 and the second opening 131; and a pressure controller 132 equipped in the second container 13 to adjust the pressure release within the second container 13.

In a preferred embodiment, the first container 11 and the second container 13 are round-bottom glass flasks.

The temperature sensor 112 includes any sensor that could sense the temperature of a solution. In a preferred embodiment, the temperature sensor 112 is a thermal couple.

The heater 12 includes any heater that could raise temperature of the first container 11. Preferably, the heater could raise temperature of the first container 11 homogeneously. In a preferred embodiment, the heater 12 is a heating mantle.

The tube 14 includes but is not limited to a thermal insulation tube. In an embodiment of the present invention, the tube 14 is a glass tube covered with a thermal insulation band.

The device optionally comprises a temperature controller (not shown in the figure), which can control the temperature within the first container 11 through the heater 12 according to the temperature feedback from the temperature sensor 112.

When using the device to prepare catalyst, we immerse the pretreated carbon-based material 15 in the platinum precursor solution in the first container 11, and the first container 11 is heated by the heater 12 to a predetermined temperature. When the platinum precursor solution in the first container 11 starts to boil and then form water vapor, which escapes from the first container 11 through first opening 111 to the second container 13 through the second opening 131. The water vapor then condenses into liquid water in the second container 13 and/or escapes from the relief valve 1321 of the pressure controller 132 when pressure in the first container 11 is higher than the predetermined pressure. The gradual concentration increase of the reducing agent in the platinum precursor solution with time can be accomplished by distilling off water in the first container 11 while increasing the temperature to the predetermined temperature and maintaining the predetermined pressure. Thus, Pt nanoparticles are reduced on the carbon-based material.

Property of Prepared Platinum Catalyst

Figure 2:
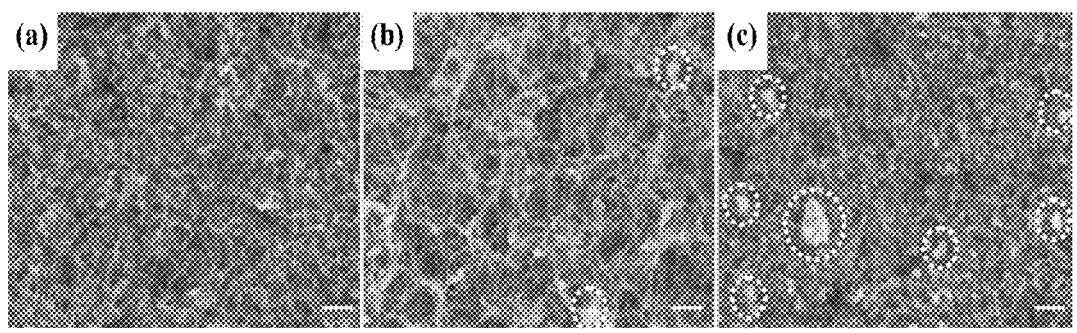
FIG. 2 shows a series of the Pt catalyst dispersion on the carbon nanotubes (CNTs) at different pressure conditions: (a) larger pressure ($P_L$), (b) normal pressure ($P_N$), and (c) smaller pressure ($P_S$). Dotted circles indicate serious aggregation of the Pt nanoclusters. (SEM magnification: 10,000×, scale bar: 1 μm)
Figure 3:
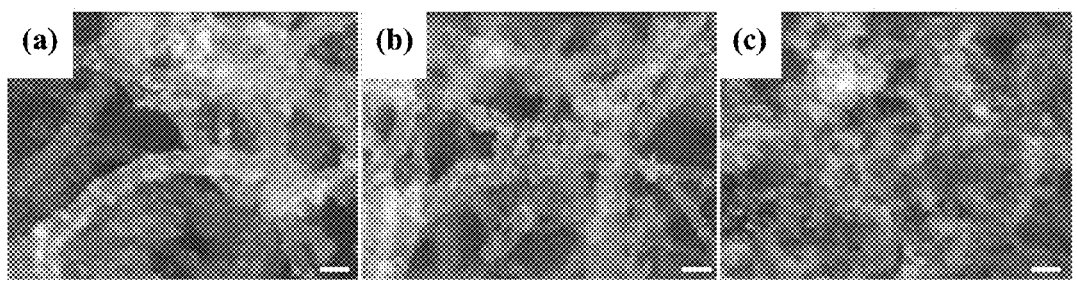
FIG. 3 shows a series of the Pt catalyst dispersion on the CNTs at different pressure conditions: (a) larger pressure ($P_L$), (b) normal pressure ($P_N$), and (c) smaller pressure ($P_S$). (SEM magnification: 100,000×, scale bar: 100 nm)
Figure 4:
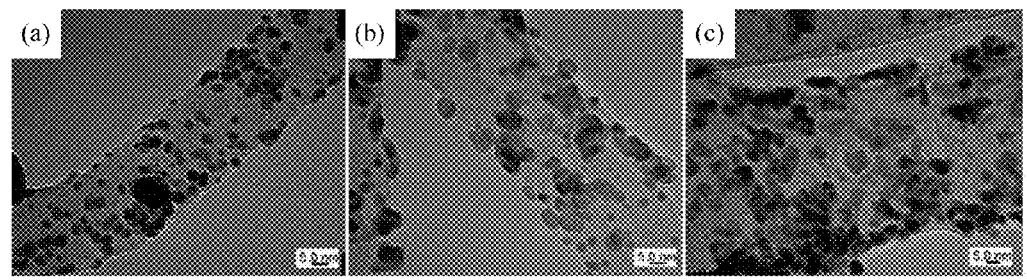
FIG. 4 shows a series of the Pt catalyst dispersion on the CNTs at different pressure conditions: (a) larger pressure ($P_L$), (b) normal pressure ($P_N$), and (c) smaller pressure ($P_S$). (TEM magnification: 800,000×, scale bar: 5 nm)

FIG. 2 shows the corresponding low-magnification SEM images at different pressure conditions ((a) 850, (b) 760 and (c) 650 torr, respectively), and the dotted circles show serious agglomeration of the Pt nanoclusters on the carbon nanotubes (CNTs). The figure clearly displays better Pt dispersion on the CNTs at larger predetermined pressure (850 torr). FIG. 3 also shows the corresponding high-magnification SEM images under the above-mentioned pressure conditions. FIG. 4 shows that the mean particle size of Pt catalysts on the CNTs calculated from the TEM images at the three different pressures of $P_L$ (850 torr), $P_N$ (760 torr) and $P_S$ (650 torr) are $2.2 \pm 0.57$, $3.2 \pm 0.67$ and $4.6 \pm 0.72$ nm, respectively. In the TEM images, the mean particle size and the standard deviation of the Pt catalysts at $P_L$ are both smaller than those at $P_N$ and $P_S$, which indicate smaller and more uniformity of the Pt particles dispersed on the CNTs at larger pressure ($P_L$).

Figure 5:
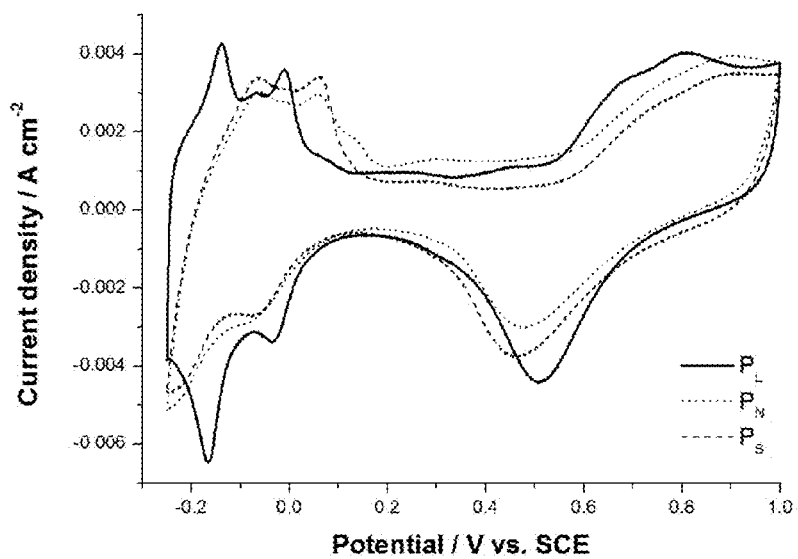
FIG. 5 shows the cyclic voltammograms of the Pt catalyst deposited on the CNTs electrodes (Pt/CNTs) at different pressure conditions for the electrosorption measurements. All of the tests were carried out in a 0.5 M $H_2SO_4$ aqueous solution with a scan rate of 50 mV $s^{-1}$, at 25° C.
Figure 6:
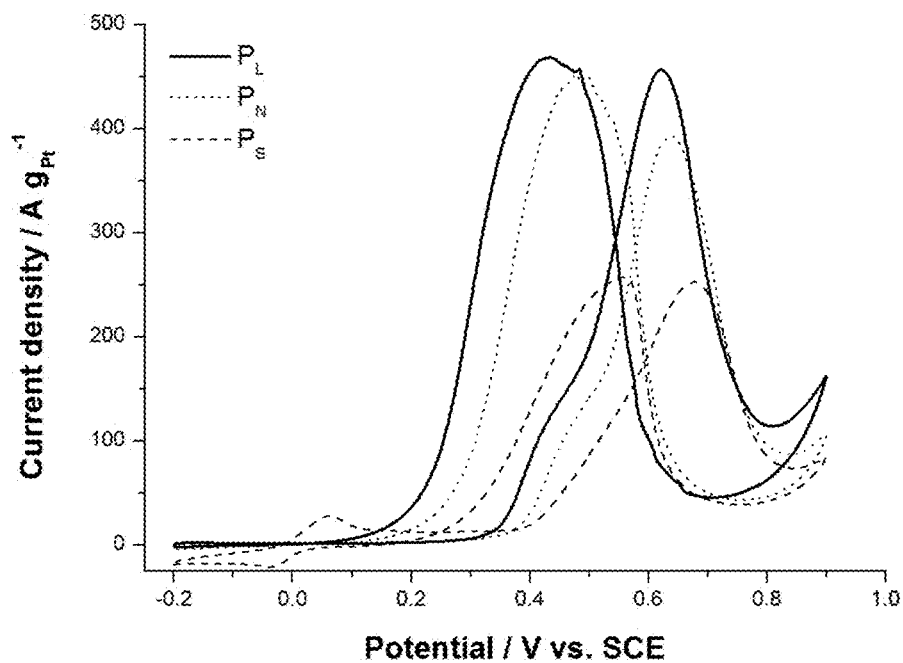
FIG. 6 shows the cyclic voltammograms of the Pt/CNTs electrodes at different pressure conditions for the methanol oxidation reaction. All of the tests were carried out in 1 M $CH_3OH$ and 0.5 M $H_2SO_4$ aqueous solutions with a scan rate of 20 mV $s^{-1}$, at 25° C.

The electrochemical properties for the prepared Pt catalysts at different pressures were measured by cyclic voltammetry (CV), as shown in FIGS. 5 and 6. The best mass activity (MA) of the Pt catalyst is 447 A $g_{Pt}^{-1}$ at $P_L$ with a mass density (Mp) of 0.18 mg $cm^{-2}$.

The electrochemical properties of the prepared Pt catalysts at different pressures of $P_L$, $P_N$ and $P_S$ are listed in Table 1, exhibiting that the electrochemical MA and electrochemical surface area (ESA) of the Pt catalysts at larger predetermined pressure ($P_L$) increased respectively by 17% and 13% in comparison with those at atmospheric pressure ($P_N$), and increased respectively by 90% and 61% in comparison with those at lower predetermined pressure ($P_S$).

TABLE 1

Electrochemical properties of the prepared Pt catalysts at different pressure conditions.

| pressure conditions | $Q_H$ (mC $cm^{-2}$) | $M_{Pt}$ (mg $cm^{-2}$) | *ESA ($m^2 g_{Pt}^{-1}$) | $E_P$ ($V_{SCE}$) | $I_P$ (mA $cm^{-2}$) | *MA (A $g_{Pt}^{-1}$) |
|---|---|---|---|---|---|---|
| $P_L$ | 15.93 | 0.18 | 41.25 | 0.62 | 80.46 | 447 |
| $P_N$ | 14.80 | 0.20 | 35.24 | 0.64 | 78.80 | 394 |
| $P_S$ | 13.17 | 0.23 | 21.76 | 0.68 | 63.71 | 277 |

*ESA = $Q_H/[(0.21 \times 10^{-3}) \times M_{Pt}]$, $Q_H$: charge transfer of $H^+$ ion electrosorption reaction.
*MA = $I_P/M_{Pt}$, $E_P$ and $I_P$ are the peak potential and peak current density of the Pt/CNT electrodes, respectively.

Figure 7:
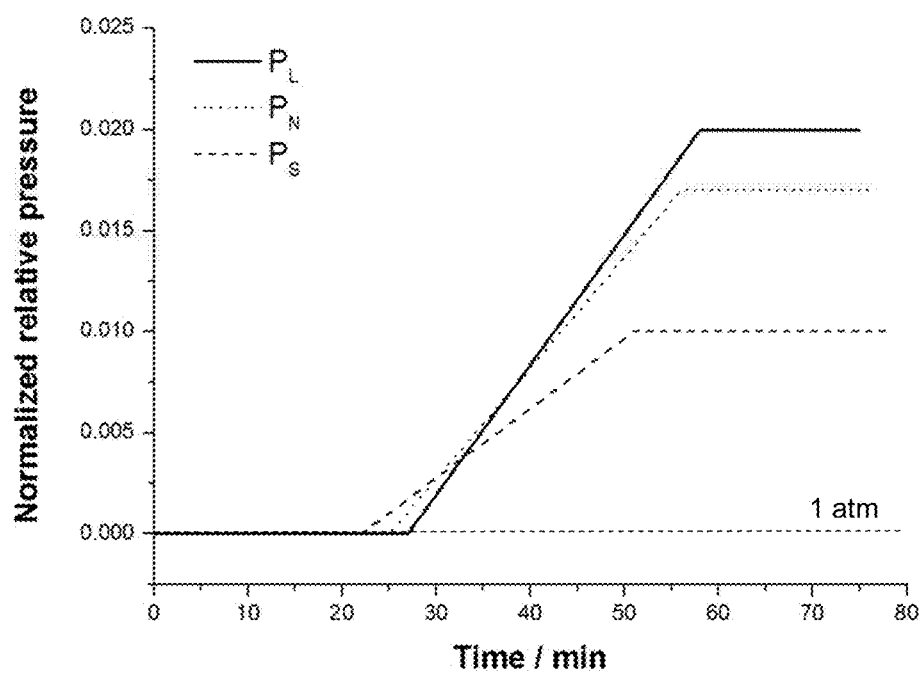
FIG. 7 shows the plots of normalized relative pressure versus time for the preparation of the Pt catalysts at different pressure conditions, where the curves record the pressure variation in the first container during the reduction process.

Referring to FIG. 7, it is shown the plots of normalized relative pressure versus time, where the curves record the pressure variation in first container 11 during the reduction process. In the middle period of time, each curve of three pressures has an individual slope. We found that the greater the slope, the shorter the time required to finish the reduction reaction. In the embodiments, the required time to finish the entire reduction reaction for $P_L$, $P_N$ and $P_S$ is less than 80 minutes.

The pH values of the platinum precursor solution before and after the reduction reaction at three pressure conditions are listed in Table 2. We found that the difference of pH values before and after the reduction reaction is negatively correlated with time.

TABLE 2

The pH changes of the platinum precursor solution before and after the reduction reaction at three pressure conditions.

| pressure conditions | | $P_L$ | $P_N$ | $P_S$ |
|---|---|---|---|---|
| pH values | before | 2.83 | 2.77 | 2.74 |
| | after | 1.31 | 1.33 | 1.37 |

Therefore, we found that the curve of the pressure versus time at higher pressure had a higher slope, also showing a larger pH difference before and after the reduction reaction as well as a shorter time required to finish the reduction reaction.

In the embodiments described above, the particle size, uniformity and electrochemical properties of the prepared Pt catalysts were improved by controlling the pressure in the first container 11. In particular, the required time is significantly shortened at higher pressure.

Furthermore, the electrochemical properties of the prepared Pt catalysts, especially the ESA and MA, show excellent electrocatalytic efficiency. Thus, the prepared Pt catalyst can be a promising candidate for the application of fuel cells, which include a membrane electrode assembly with an anode, a cathode and a proton-conductive film provided between the anode and the cathode, wherein the anode and the cathode each or both optimized by the prepared catalysts.

The preferred embodiments described above are disclosed for illustrative purpose but to limit the modifications and variations of the present invention. Thus, any modifications and variations made without departing from the spirit and scope of the invention should still be covered by the scope of this invention as disclosed in the accompanying claims.

What is claimed is:

1. A method of preparing platinum catalyst, comprising:
   providing a carbon-based material;
   immersing the carbon-based material with a platinum precursor solution in a first container;
   controlling pressure and temperature within the first container to a predetermined temperature and predetermined pressure to form water vapor, and then allowing the water vapor to escape from the first container through a first opening of the first container to a second container; and
   maintaining the predetermined temperature and predetermined pressure within the first container for a period of time to deposit the platinum catalyst on the carbon-based material.

2. The method according to claim 1, wherein the carbon-based material is pretreated with a strong acid solution under a vacuum condition to exhibit a hydrophilic surface property.

3. The method according to claim 2, wherein the vacuum condition is less than $9 \times 10^{-2}$ torr.

4. The method according to claim 1, wherein the carbon-based material comprises single-walled carbon nanotubes, double-walled carbon nanotubes, multi-walled carbon nanotubes, nanofibers or graphene.

5. The method according to claim 1, wherein the platinum precursor comprises chloroplatinic acid, platinum chloride or platinum nitrate.

6. The method according to claim 1, wherein the platinum precursor solution further comprises a reducing agent and deionized water.

7. The method according to claim 6, wherein the reducing agent comprises methanol, ethylene glycol, formaldehyde, paraformaldehyde, sodium borohydride, sodium thiosulfate, sodium sulfite, ethanol, citric acid or glucose.

8. The method according to claim 1, wherein the predetermined temperature is 110-160° C.

9. The method according to claim 1, wherein the predetermined pressure is 760-850 torr.

10. The method according to claim 1, wherein the first container and the second container are both round-bottom glass flasks.

11. The method according to claim 1, wherein the period of time is less than 80 minutes.

12. The method according to claim 1, wherein the mean particle size of the platinum catalyst is 2.2-3.2 nm.

13. A device for implementing the method according to claim 1, comprising:
   a first container with a first opening;
   a temperature sensor and a pressure sensor, equipped in the first container;
   a heater for heating the first container;
   a second container with a second opening;
   a tube for connecting the first opening and the second opening; and
   a pressure controller equipped in the second container to adjust the pressure release within the second container.

14. The device according to claim 13, wherein the temperature sensor is a thermal couple.

15. The device according to claim 13, wherein the heater is a heating mantle connected to a temperature controller.

16. The device according to claim 15, wherein the temperature controller is to control the temperature within the first container through the heater according to the temperature feedback from the temperature sensor.

17. The device according to claim 13, wherein the tube is a thermal insulation tube.

18. The device according to claim 13, wherein the tube is covered with a thermal insulation band.

19. The device according to claim 13, wherein the pressure controller controls the pressure in the first container by adjusting the degree of gas release within the second container.

20. A fuel cell comprising a membrane electrode assembly, which comprises a cathode comprising a first catalyst, an anode comprising a second catalyst and a proton-conductive membrane; wherein at least one of the first catalyst or the second catalyst is prepared by the method according to claim 1.

\* \* \* \* \*